United States Patent
Amulothu et al.

(10) Patent No.: US 9,680,731 B2
(45) Date of Patent: Jun. 13, 2017

(54) ADAPTIVE SOFTWARE DEFINED NETWORKING CONTROLLER

(71) Applicant: International Business Machines Corporation, Armonk, NY (US)

(72) Inventors: Venkata Siva N. Amulothu, Cary, NC (US); Ashish Kapur, Santa Clara, CA (US); Khurram Khani, Mountain House, CA (US); Vishal Shukla, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 120 days.

(21) Appl. No.: 14/633,173

(22) Filed: Feb. 27, 2015

(65) Prior Publication Data

US 2016/0254986 A1    Sep. 1, 2016

(51) Int. Cl.
| | |
|---|---|
| *H04L 12/26* | (2006.01) |
| *H04L 12/721* | (2013.01) |
| *H04L 12/803* | (2013.01) |
| *H04L 12/729* | (2013.01) |

(52) U.S. Cl.
CPC ............ *H04L 45/12* (2013.01); *H04L 45/125* (2013.01); *H04L 45/38* (2013.01); *H04L 47/122* (2013.01); *H04L 43/0882* (2013.01)

(58) Field of Classification Search
CPC ..... H04L 41/0654; H04L 45/12; H04L 45/38; H04L 45/54; H04L 45/64; H04L 45/586; H04L 47/122; H04L 47/125; H04L 49/50
USPC .......................... 370/229, 235, 236, 254, 238
See application file for complete search history.

(56) References Cited

U.S. PATENT DOCUMENTS

| | | | |
|---|---|---|---|
| 8,284,665 | B1 | 10/2012 | Aybay et al. |
| 8,711,860 | B2 | 4/2014 | Beliveau et al. |
| 2012/0120964 | A1 | 5/2012 | Koponen et al. |
| 2013/0044636 | A1 | 2/2013 | Koponen et al. |
| 2013/0212243 | A1 | 8/2013 | Thakkar et al. |
| 2013/0223442 | A1 | 8/2013 | Narayanan et al. |
| 2013/0272121 | A1 | 10/2013 | Stanwood et al. |
| 2014/0029427 | A1 | 1/2014 | Huici et al. |
| 2014/0098674 | A1* | 4/2014 | Sonoda ................... H04L 45/38 370/235 |
| 2014/0108632 | A1 | 4/2014 | Narasimha et al. |
| 2014/0269319 | A1 | 9/2014 | DeCusatis et al. |

(Continued)

FOREIGN PATENT DOCUMENTS

WO    2014098117 A1    6/2014

OTHER PUBLICATIONS

Moy, J., "OSPF Version 2", RFC 2328, Standards Track, Apr. 1998, pp. 1-244, Copyright (C) The Internet Society (1998), <http://tools.ietf.org/html/rfc2328>.

*Primary Examiner* — Kwang B Yao
*Assistant Examiner* — Harun Chowdhury
(74) *Attorney, Agent, or Firm* — Brian M. Restauro

(57) ABSTRACT

Embodiments of the present invention provide methods, computer program products, and systems for generating a shortest data path for data packets. Embodiments of the present invention can be used to exclude switches at or near their maximum capacity of flow entries from the shortest data path calculation. Embodiments of the present invention can be used to reduce the "lag time" users can experience while waiting for data packets to be forwarded through different switches.

14 Claims, 5 Drawing Sheets

(56) References Cited

U.S. PATENT DOCUMENTS

2014/0286336 A1 9/2014 Narayanan et al.
2015/0009827 A1* 1/2015 Kawai ............... H04L 45/64
370/235

* cited by examiner

ADAPTIVE SOFTWARE DEFINED NETWORKING CONTROLLER

TECHNICAL FIELD

The present invention relates generally to the field of software-defined networking, and more particularly to software-defined networking controllers.

BACKGROUND

A data processing environment comprises a variety of hardware, software, and firmware networking components. A physical network, also called an underlay, is a network defined using such components. An example of a networking component in a physical network is a switch. A switch is a device that channels incoming data from any of multiple input ports to the specific output port that will take the data toward its intended destination. When a packet of data arrives at a switch in a conventional network, rules built into the switch's firmware tell the switch where to forward the packet. The switch sends every packet going to the same destination along the same path. Smart switches designed with application specific integrated circuits (ASICs) can recognize different types of packets and treat them differently.

Techniques are available presently to construct a logical network, also known as a software defined network (SDN) overlay (hereinafter interchangeably, "SDN" or "overlay"), from networking components of a physical network. Essentially, networking components are abstracted into corresponding logical or virtual representations, and the abstractions are used to define the SDN. In other words, an SDN is a logical network formed and operated using logical representations of underlying networking components.

Physical networks usually exist within the demarcated boundary of the data processing environment whose networking components are utilized in the physical network. Unlike a physical network, an SDN can be designed to span across one or more data processing environment. For example, while a physical network may be contained within a datacenter, an SDN may span across one or more datacenters.

As an example, a logical representation of a hypervisor can participate in an SDN, such that a function attributed to the logical representation of the hypervisor in the SDN is actually performed by the underlying hypervisor component in the underlay. Similarly, a logical representation of a networking gateway can participate in an SDN, such that a function attributed to the logical representation of the networking gateway in the SDN is actually performed by the underlying networking gateway component in the underlay.

In an SDN, because the actual networking components that perform the networking functions are abstracted into logical entities representing the networking functionality offered by those components and not the actual implementations of those functionalities, something is needed to direct those networking functionalities into a functioning logical network. An SDN controller is a component that manages and operates the logical networking components within an SDN. For example, an SDN controller manages flow entries of physical switches in an underlay network.

SUMMARY

In one embodiment of the present invention, a method for generating a shortest data path is provided. The method includes receiving, from each particular switch of a plurality of switches in a network, a data packet comprising information indicating a respective maximum capacity of flow entries that can be installed on that particular switch. The method further includes specifying, for each particular switch of the plurality of switches, a threshold number of flow entries based on the respective maximum capacity of flow entries that can be installed on that particular switch. The method further includes identifying one or more switches in the network having a number of installed flow entries that is greater than or equal to the respective threshold number of flow entries that can be installed. The method further includes excluding the identified one or more switches from a calculation of a shortest data path for a data packet through two or more of the plurality of switches.

In another embodiment of the present invention, a computer program product for generating a shortest data path is provided. The computer program product includes one or more computer readable storage media and program instructions stored on the one or more computer readable storage media. The program instructions include program instructions to receive, from each particular switch of a plurality of switches in a network, a data packet comprising information indicating a respective maximum capacity of flow entries that can be installed on that particular switch. The program instructions further include program instructions to specify, for each particular switch of the plurality of switches, a threshold number of flow entries based on the respective maximum capacity of flow entries that can be installed on that particular switch. The program instructions further include program instructions to identify one or more switches in the network having a number of installed flow entries that is greater than or equal to the respective threshold number of flow entries that can be installed. The program instructions further include program instructions to exclude the identified one or more switches from a calculation of a shortest data path for a data packet through two or more of the plurality of switches.

In yet another embodiment of the present invention, a computer system for generating a shortest data path is provided. The computer system includes one or more computer processors, one or more computer readable storage media, and program instructions stored on the one or more computer readable storage media for execution by at least one of the one or more processors. The program instructions include program instructions to receive, from each particular switch of a plurality of switches in a network, a data packet comprising information indicating a respective maximum capacity of flow entries that can be installed on that particular switch. The program instructions further include program instructions to specify, for each particular switch of the plurality of switches, a threshold number of flow entries based on the respective maximum capacity of flow entries that can be installed on that particular switch. The program instructions further include program instructions to identify one or more switches in the network having a number of installed flow entries that is greater than or equal to the respective threshold number of flow entries that can be installed. The program instructions further include program instructions to exclude the identified one or more switches from a calculation of a shortest data path for a data packet through two or more of the plurality of switches.

DETAILED DESCRIPTION

Embodiments of the present invention recognize that SDN controllers assume that switches can take infinite flow entries, which can cause switches to be overloaded with many flow entries. For example, the shortest data path between two points in an SDN could be overloaded with many flow entries and may not be the fastest path. In some instances, the second shortest path may, in fact, be the fastest path. Embodiments of the present invention provide efficient solutions for making an SDN controller adaptive to changing conditions of a switching infrastructure. In this manner, as discussed in greater detail in this specification, embodiments of the present invention can be used to calculate the shortest data path to forward data packets based, at least in part, on switch usage.

Figure 1:
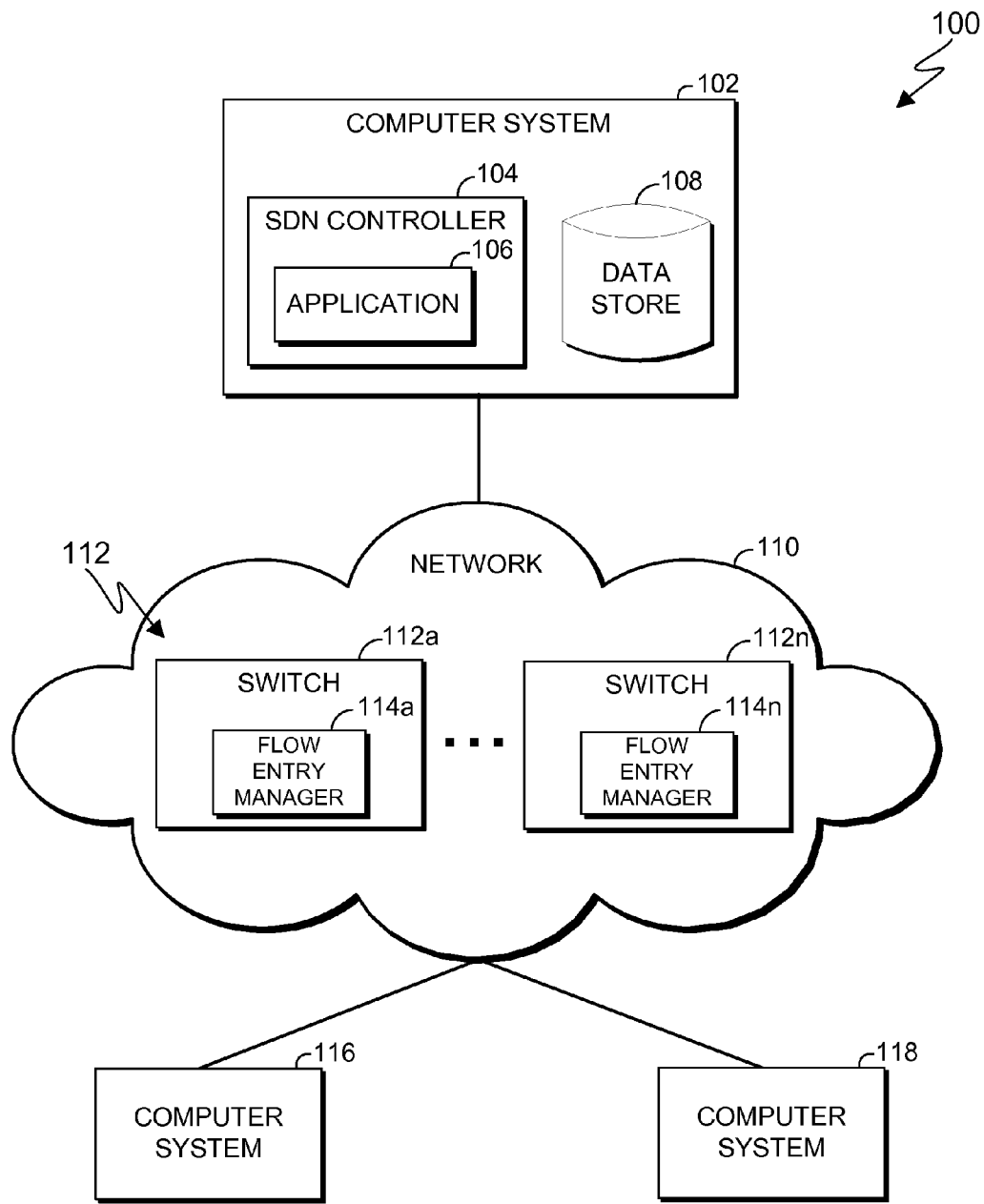
FIG. 1 is a functional block diagram illustrating a computing environment, in accordance with an embodiment of the present invention.

FIG. 1 is a functional block diagram of a computing environment 100, in accordance with an embodiment of the present invention. Computing environment 100 includes a computer system 102, a computer system 116, and a computer system 118, interconnected via an underlay network 110. Computer system 102, computer system 116, and computer system 118 can be desktop computers, laptop computers, server computers, or any other computer systems known in the art. In certain embodiments, computer system 102, computer system 116, and computer system 118 represent computer systems utilizing clustered computers and components to act as a single pool of seamless resources when accessed through network 110. For example, such embodiments may be used in data center, cloud computing, storage area network (SAN), and network attached storage (NAS) applications. In certain embodiments, computer system 102, computer system 116, and computer system 118 represent virtual machines. In general, computer system 102, computer system 116, and computer system 118 are representative of any electronic devices, or combination of electronic devices, capable of executing machine-readable program instructions, as described in greater detail with regard to FIG. 5.

Network 110 includes one or more switches 112a-n. Network 110 can be, for example, a local area network (LAN), a wide area network (WAN) such as the Internet, or a combination of the two, and include wired, wireless, or fiber optic connections. In general, network 110 can be any combination of connections and protocols that will support communications between computer system 102, switches 112a-n, computer system 116, and computer system 118, in accordance with a desired embodiment of the invention.

Switches 112a-n are devices that channel incoming data packets from any of multiple input ports to specific output ports that can then forward data packets towards their intended destination. For example, switches 112a-n can forward data packets from computer system 116 to computer system 118 and vice-versa. Each of switches 112a-n includes a respective flow entry manager 114a-n, where flow entry manager 114a resides on switch 112a, flow entry manager 114b resides on switch 112b, flow entry manager 114c resides on switch 112c, and so on.

Each of flow entry managers 114a-n may interact with an application 106 and install flow entries on respective switches 112a-n. The term "flow entry", as used herein, refers to one or more rules and/or instructions that direct a switch on how to forward data packets. Each of flow entry managers 114a-n are capable of sending data packets to one or more switches until the data packets reach their final destination (e.g., another computer). Flow entry managers 114a-n can be configured to execute networking functions of network 110. For example, in an embodiment, flow entry managers 114a-n can broadcast Link Layer Discovery Protocol (LLDP) packets comprising a Type-Length-Value (TLV) which comprises, the DataPath_Id (e.g., the Media Access Control (MAC) address of the switch), the application specific integrated circuit (ASIC) type used by the switch, and the number of flow entries supported by the switch (e.g., 100 entries). In another embodiment, one or more flow entry managers 114a-n may not broadcast TLV.

Each of flow entry managers 114a-n can also send error packets to an SDN controller 104. For example, flow entry manager 114a can send an error packet to SDN controller 104 to indicate that switch 112a is at or near capacity. In this embodiment, the error packets may comprise an error type and an error code that SDN controller 104 can recognize. For example, type 3 can mean that there is a problem modifying a flow entry. Code 6 can mean that the flow entry table passed the size of configurable limit (e.g., switch 112a has flow entries installed that are greater than or equal to 90% of its flow entry capacity).

Computer system 102 includes SDN controller 104 and data store 108. SDN controller 104 manages flow entries of switches 112a-n of network 110 based on communications protocols. Communications protocols, for example, can allow SDN controller 104 to remotely add, modify, and remove packet matching rules and actions which allows SDN controller 104 to access and control switches 112a-n. SDN controller 104 may have a full view of switches 112a-n in network 110. For illustrative purposes, this embodiment may be discussed with respect to computer system 102 facilitating sending and receiving packets of data between computer system 116 and computer system 118, it being understood that each of computer systems 102, 116, and 118 can facilitate sending and receiving packets of data from one or more components in computing environment 100.

SDN Controller 104 includes application 106. Application 106 detects switches 112a-n and generates a "capability table" for switches 112a-n. The term "capability table", as used herein, refers to a table that stores usage details (e.g., the number of flow entries supported by a particular switch and the "hit bit") of each of switches 112a-n, and is used to determine the data path a data packet will take.

The term "hit bit", as used herein, refers to a value that alerts SDN controller 104 that a switch is near its maximum capacity of flow entries. In this embodiment, the hit bit is associated with a specified threshold of flow entries that can be installed on a particular switch. The specified threshold of flow entries that can be installed on a particular switch can be expressed as a percentage of the maximum capacity of flow entries that can be installed on that switch. In this embodiment, application 106 can specify that the specified threshold is greater than or equal to 90% of the maximum capacity of flow entries that can be installed on that switch. Responsive to determining that a switch has reached the specified threshold, application 106 sets the hit bit to "1" in the capability table to indicate that switch has reached 90% capacity. If, for example, a switch has not reached the specified threshold, application 106 displays a "0" in the capability table to indicate that switch has not reached 90% capacity. In other embodiments, the hit bit can be configured to any user defined threshold.

For example, flow entry manager 114a of switch 112a can send application 106 an error packet for a particular switch, such as switch 112a. Application 106 then interprets that error packet and determines the number of flow entries currently installed on switch 112a is greater than or equal to 90% of its specified threshold. Application 106 then sets the hit bit to "1" in the capability table to indicate that switch 112a has reached 90% capacity. If, for example, switch 112a has not reached 90% capacity, application 106 sets the hit bit to "0" in the capability table to indicate that switch 112a has not yet reached 90% of its capacity.

In this embodiment, for each of switches 112a-n, the capability table comprises a DataPath_Id (e.g., the MAC address of the switch), the application specific integrated circuit (ASIC) type used by the switch, a number of flow entries supported by the switch (e.g., 100 entries), and a hit bit.

Figure 4:
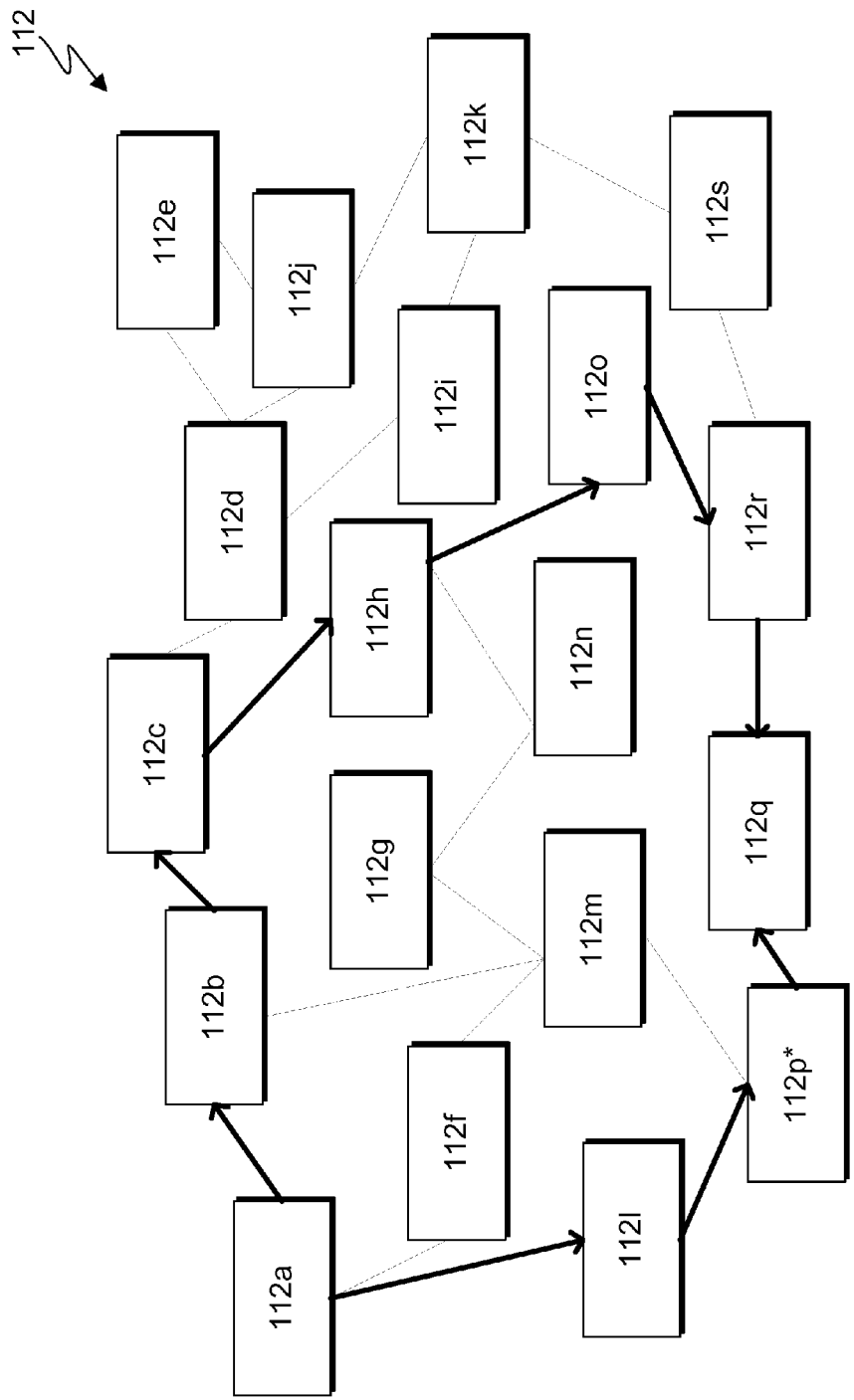
FIG. 4 is a block diagram of example data paths through which data packets can be forwarded, in accordance with an embodiment of the present invention.

Application 106 also generates data paths for data packets, as shown in greater detail in FIG. 4. In this embodiment, the data path is based, at least in part, on the maximum number of flow entries supported by the switches through which the data packets are passed. Application 106 updates the capability table each time a data path for a data packet is generated to reflect the most current usage details of switches 112a-n.

Data store 108 stores the capability table created and maintained by application 106. Data store 108 can be implemented using any storage media known in the art.

Figure 2:
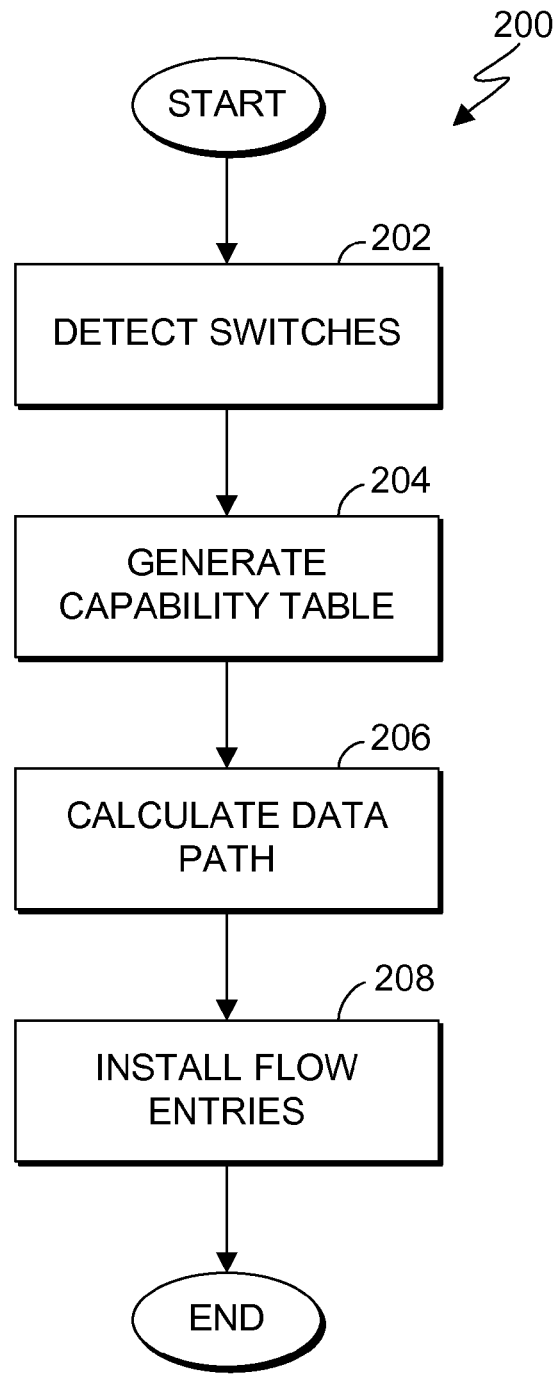
FIG. 2 is a flowchart illustrating operational steps for installing flow entries, in accordance with an embodiment.

FIG. 2 is a flowchart 200 illustrating operational steps for installing flow entries, in accordance with an embodiment of the present invention.

In step 202, application 106 detects switches 112a-n. In this embodiment, application 106 receives LLDP TLV packets from each of flow entry managers 114a-n from their respective switches 112a-n, which allows application 106 to detect their presence. The LLDP packets allow switches 112a-n to communicate information about themselves to other nodes and application 106. In this embodiment, LLDP packets comprise the following type-length-value (TLV) added to it: DataPath_Id, ASIC type supported by the switch, and number of flow entries supported by the switch. For example, an LLDP packet can contain the following information: DataPath_Id number of switch 112a is 00: 0a: 95: 9d: 68:16, the ASIC type is Standard-Cell based, and the number of flow entries supported is 100.

In step 204, application 106 generates a capability table. In this embodiment, application 106 generates a capability table comprising entries for the DataPath_Id, ASIC type, number of flow entries supported, the last known number of flow entries installed, and the hit bit for each of switches 112a-n, and stores the generated capability table in data store 108. For example, application 106 can access the LLDP packet broadcasted by switch 112a and identify that the DataPath_Id is 00: 0a: 95: 9d: 68:16, the ASIC type is Standard-Cell based, and the number of flow entries supported is 100 for switch 112a. Application 106 would assign switch 112a a hit bit of zero because, by default, the hit bit is set to zero until application 106 determines that a switch is at capacity. For example, application 106 can determine a switch is at capacity in response to receiving an error packet from a switch indicating that the switch has reached the specified threshold (e.g., 90% of flow entries capacity). Application 106 can also determine that a switch has reached capacity by reading the capability table. In response to detecting a new switch, the entry for the last known number of flow entries for that switch is populated as zero. For example, application 106 can detect switch 112a as a new switch. Application 106 can then populate the entry for the last known number of flow entries for switch 112a as zero.

In this embodiment, where one or more of flow entry managers 114a-n do not broadcast TLV, application 106 can still add entries to the capability table for the corresponding switch. For example, if flow entry manager 114c does not broadcast TLV, application 106 marks all columns in the capability table as NULL for switch 112c.

In step 206, application 106 calculates a data path for data packets based, at least in part, on the capacity of each switch, such that switches at or exceeding the specified threshold are excluded from the data path calculation.

In step 208, application 106 transmits the data path to SDN controller 104, and SDN controller 104 installs the appropriate flow entries on the switches in the generated data path. The data packets can then be transmitted along the data path.

Accordingly, in this embodiment, application 106 installs flow entries on switches 112a-n so that data packets are not forwarded to switches at or exceeding their specified maximum capacity. Thus, this embodiment can be used to reduce lag time between sending data packets through switches by excluding switches at or near capacity from the data path calculation.

Figure 3:
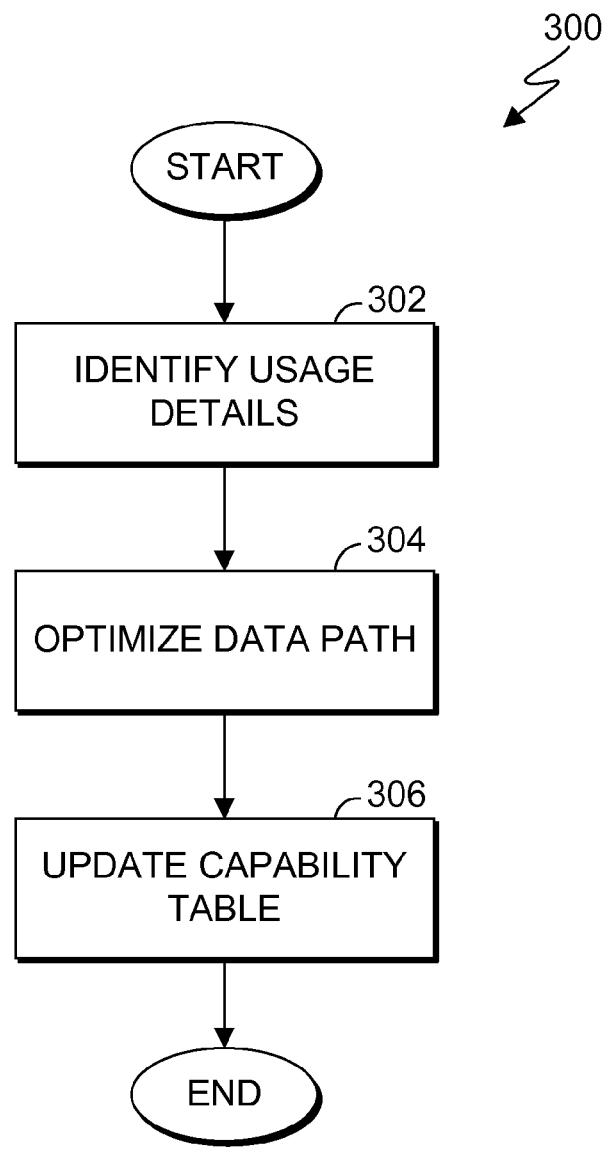
FIG. 3 is a flowchart illustrating operational steps for calculating a shortest data path through switches, in accordance with an embodiment of the present invention.

FIG. 3 is a flowchart 300 illustrating operational steps for calculating a data path through switches, in accordance with an embodiment of the present invention. For example, the operational steps of flowchart 300 can be performed at step 206 of flowchart 200.

In step 302, application 106 identifies usage details of switches 112a-n. In this embodiment, application 106 accesses the capability table to identify the hit bit, the number of flow entries supported, and the last known number of flow entries installed for each of switches 112a-n.

In step 304, application 106 optimizes the data path for a received packet of data. In this embodiment, application 106 optimizes the data path by accessing the capability table, identifying switches in the capability table having a hit bit of 1, and excluding the identified switches from the shortest data path calculation. For example, application 106 can access the capability table and identify that a particular switch has a hit bit of 1 (e.g., has reached or exceeded the specified threshold of flow entries installed on that switch). Application 106 can then exclude that particular switch from the shortest data path calculation (e.g., calculated using a known algorithm, such as Dijkstra's algorithm or the Bellman-Ford algorithm), thereby optimizing the data path because excluding switches at or exceeding capacity from a data path calculation can reduce the "lag time" between sending packets of data through different switches until those data packets make it to their final destination, as discussed in greater detail with regard to FIG. 4.

Where the usage details on the capability table for a switch are NULL, application 106 marks the hit bit as 1 (e.g., greater than or equal to the specified threshold of total flow entries capacity) if the physically adjacent switch (i.e., the switch closest to the NULL switch) has a hit bit of 1, and excludes that switch from the shortest data path calculation. Conversely, where the adjacent switch has a hit bit of 0, application 106 assumes the switched marked NULL to have a hit bit of 0 as well, and includes that switch in the shortest data path calculation.

In step 306, application 106 updates the capability table. In this embodiment, application 106 updates the number of flow entries last known and the hit bit of each of switches 112a-n after it calculates a data path for a data packet. For example, application 106 can select five of switches 112a-n as the data path to forward a data packet. Application 106 can then update the number of flow entries for those five switches by one. Application 106 can then recalculate the hit bit of each of those switches, and update the capability table accordingly. For example, switch 112a can have a maximum capacity of 10 flow entries. The last known flow entry installed was 2. After installing this flow entry, switch 112a has 3 flow entries installed. Thus, switch 112a has 30% of its specified maximum capacity (e.g., 3/10), which is not greater than or equal to the 90% threshold required to trigger an update of the hit bit from 0 to 1.

In another example, application 106 can update the capability table after the number of flow entries on a switch has been reduced below the configured threshold. In this embodiment, application 106 updates the capability table to reflect that a switch is below its specified threshold (e.g., 90%) by receiving a broadcast from its respective flow entry manager. For example, switch 112a may have a maximum capacity of 10 flow entries and currently have 9 flow entries installed. After a flow entry has been processed, the switch's respective flow entry manager (e.g., flow entry manager 114a) can communicate to application 106 that the number of flow entries for its respective switch has been reduced from 9 flow entries to 8. Thus, switch 112a would be at 80% of its total capacity (e.g., 8/10), which is not greater than or equal to the 90% threshold, triggering an update of the hit bit from 1 to 0.

Accordingly, in this embodiment, application 106 calculates data paths for data packets so that flow entries are not installed in switches at or exceeding their specified threshold. Again, excluding switches at or exceeding their maximum capacity can reduce the lag time users can experience while waiting for data packets to be forwarded through different switches.

FIG. 4 is a block diagram of example data paths through which data packets can be forwarded, in accordance with an embodiment of the present invention. In this example, application 106 determines the shortest data path from computer system 116 to computer system 118, where computer 116 is connected to switch 112a and computer system 118 is connected to switch 112q. Application 106 determines that ordinarily, the shortest data path from computer system 116 to computer system 118 is from switches 112a to 112l, from 112l to 112p, from 112p to 112q. However, application 106 identifies that switch 112p has a hit bit of 1 (denoted by an asterisk). Application 106, therefore, excludes switch 112p from the data path calculation. Thus, even though the shortest physical pathway to computer 118 from computer system 116 is from switches 112a to 112l, from 112l to 112p, and from 112p to 112q, application 106 calculates that the shortest physical pathway that excludes switch 112p (i.e., from switches 112a to 112b, from 112 b to 112c, from 112c to 112h, from 112h to 112o, and from 112o to 112r) would actually be the fastest data path.

Figure 5:
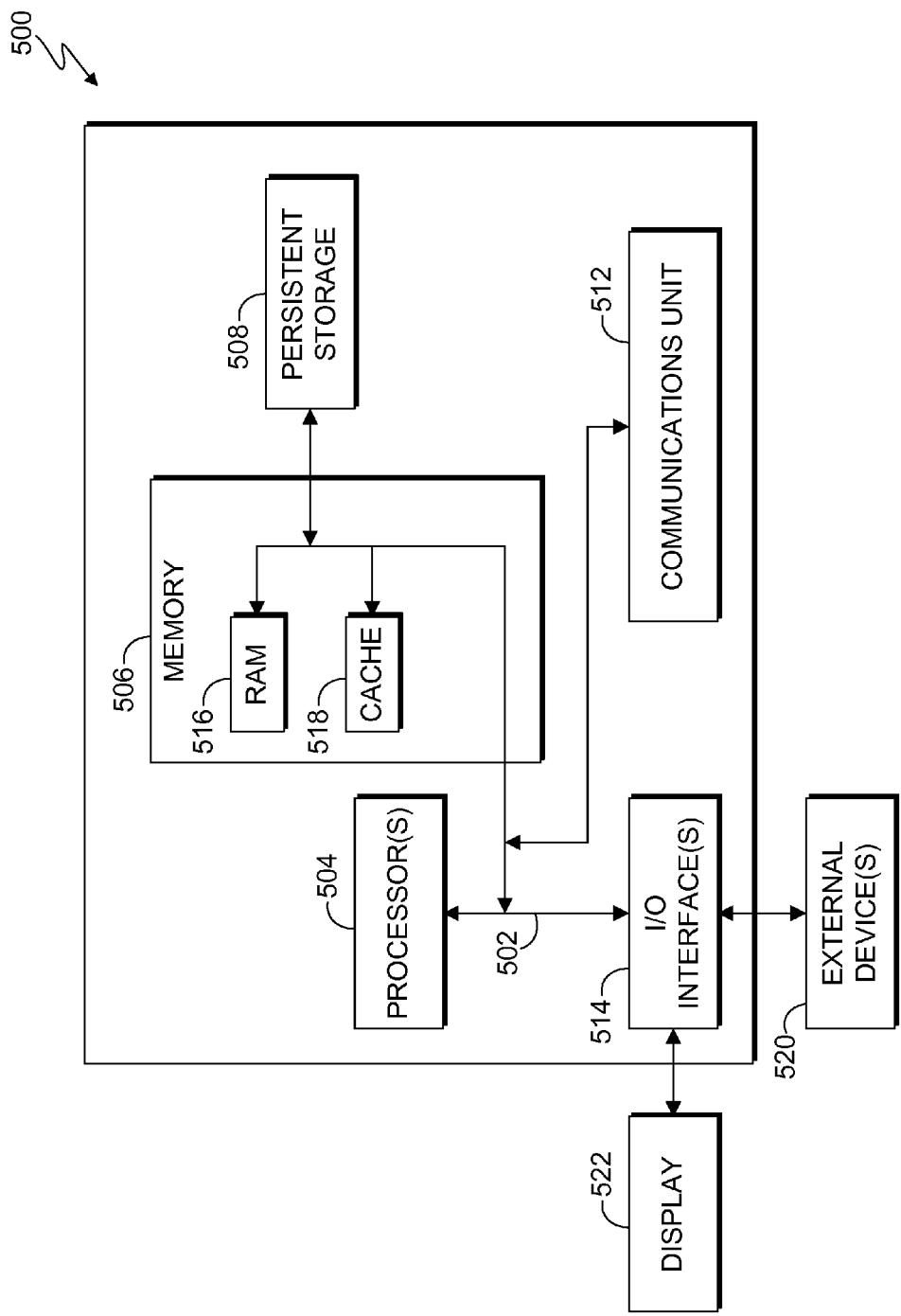
FIG. 5 is a block diagram of internal and external components of the computer systems of FIG. 1, in accordance with an embodiment of the present invention.

FIG. 5 is a block diagram of internal and external components of a computer system 500, which is representative the computer systems and switches of FIG. 1, in accordance with an embodiment of the present invention. It should be appreciated that FIG. 5 provides only an illustration of one implementation and does not imply any limitations with regard to the environments in which different embodiments may be implemented. In general, the components illustrated in FIG. 5 are representative of any electronic device capable of executing machine-readable program instructions. Examples of computer systems, environments, and/or configurations that may be represented by the components illustrated in FIG. 5 include, but are not limited to, personal computer systems, server computer systems, thin clients, thick clients, laptop computer systems, tablet computer systems, cellular telephones (e.g., smart phones), multiprocessor systems, microprocessor-based systems, network PCs, minicomputer systems, mainframe computer systems, and distributed cloud computing environments that include any of the above systems or devices.

Computer system 500 includes communications fabric 502, which provides for communications between one or more processors 504, memory 506, persistent storage 508, communications unit 512, and one or more input/output (I/O) interfaces 514. Communications fabric 502 can be implemented with any architecture designed for passing data and/or control information between processors (such as microprocessors, communications and network processors, etc.), system memory, peripheral devices, and any other hardware components within a system. For example, communications fabric 502 can be implemented with one or more buses.

Memory 506 and persistent storage 508 are computer-readable storage media. In this embodiment, memory 506 includes random access memory (RAM) 516 and cache memory 518. In general, memory 506 can include any suitable volatile or non-volatile computer-readable storage media. Software is stored in persistent storage 508 for execution and/or access by one or more of the respective processors 504 via one or more memories of memory 506. Such software can be SDN controller 104, application 106, and/or any or all of flow entry managers 114a-114n.

Persistent storage 508 may include, for example, a plurality of magnetic hard disk drives. Alternatively, or in addition to magnetic hard disk drives, persistent storage 508 can include one or more solid state hard drives, semiconductor storage devices, read-only memories (ROM), erasable programmable read-only memories (EPROM), flash memories, or any other computer-readable storage media that is capable of storing program instructions or digital information.

The media used by persistent storage 508 can also be removable. For example, a removable hard drive can be used for persistent storage 508. Other examples include optical and magnetic disks, thumb drives, and smart cards that are inserted into a drive for transfer onto another computer-readable storage medium that is also part of persistent storage 508.

Communications unit 512 provides for communications with other computer systems or devices via a network (e.g., network 110). In this exemplary embodiment, communications unit 512 includes network adapters or interfaces such as a TCP/IP adapter cards, wireless Wi-Fi interface cards, or 3G or 4G wireless interface cards or other wired or wireless communication links. The network can comprise, for example, copper wires, optical fibers, wireless transmission, routers, firewalls, switches, gateway computers and/or edge servers. Software and data used to practice embodiments of the present invention can be downloaded to computer system 102 through communications unit 512 (e.g., via the Internet, a local area network or other wide area network).

From communications unit 512, the software and data can be loaded onto persistent storage 508.

One or more I/O interfaces 514 allow for input and output of data with other devices that may be connected to computer system 500. For example, I/O interface 514 can provide a connection to one or more external devices 520 such as a keyboard, computer mouse, touch screen, virtual keyboard, touch pad, pointing device, or other human interface devices. External devices 520 can also include portable computer-readable storage media such as, for example, thumb drives, portable optical or magnetic disks, and memory cards. I/O interface 514 also connects to display 522.

Display 522 provides a mechanism to display data to a user and can be, for example, a computer monitor. Display 522 can also be an incorporated display and may function as a touch screen, such as a built-in display of a tablet computer.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

The invention claimed is:

1. A method for generating a shortest data path, the method comprising:

receiving, by one or more computer processors, from each particular switch of a plurality of switches in a network, a data packet comprising information indicating a respective maximum capacity of flow entries that can be installed on that particular switch;

specifying, by one or more computer processors, for each particular switch of the plurality of switches, a threshold number of flow entries based on the respective maximum capacity of flow entries that can be installed on that particular switch;

identifying, by one or more computer processors, one or more switches in the network having a number of installed flow entries that is greater than or equal to the respective threshold number of flow entries that can be installed, wherein identifying one or more switches in the network having a number of installed flow entries that is greater than or equal to the respective threshold number of flow entries that can be installed comprises:

monitoring, by one or more computer processors, usage details of the plurality of switches in the network, generating, by one or more computer processors, a table comprising the usage details and an indicator for each particular switch of the plurality of switches as to whether to exclude that particular switch from data path calculations, and accessing, by one or more computer processors, the table to identify one or more switches in the network having an indicator that indicates that the switch should be excluded from data path calculations;

excluding, by one or more computer processors, the identified one or more switches from a calculation of a shortest data path for a data packet through two or more of the plurality of switches; and responsive to receiving from a first switch in the network a data packet that does not include a maximum capacity of flow entries that can be installed on the first switch, determining by one or more computer processors, whether a second switch that is physically adjacent to the first switch has an indicator indicating that the second switch should be excluded from data path calculations; and responsive to determining that the second switch has an indicator indicating that the second switch should be excluded from data path calculations, excluding the first switch from data path calculations.

2. The method of claim 1, further comprising:
after the shortest data path is calculated, updating, by one or more computer processors, the usage details in the table.

3. The method of claim 1, further comprising:
responsive to receiving from a first switch in the network a data packet that does not include a maximum capacity of flow entries that can be installed on the first switch, determining, by one or more computer processors, whether a second switch that is physically adjacent to the first switch has an indicator indicating that the second switch should be included in data path calculations; and responsive to determining that the second switch has an indicator indicating that the second switch should be included in data path calculations, including the first switch in data path calculations.

4. The method of claim 1, further comprising:
receiving, by one or more computer processors, an error notification from a first switch in the network that indicates that a number of flow entries installed on the first switch exceeds a maximum capacity of flow entries that can be installed on the first switch; and responsive to receiving the error notification, setting, by one or more computer processors, an indicator for the first switch indicating that the first switch should be excluded from data path calculations.

5. The method of claim 1, further comprising:
installing, by one or more computer processors, flow entries on each switch of the shortest data path.

6. A computer readable storage media storing program instructions causing a processor to execute the program instructions to generate a shortest data path, the program instructions comprising:

program instructions to receive from each particular switch of a plurality of switches in a network, a data packet comprising information indicating a respective maximum capacity of flow entries that can be installed on that particular switch;

program instructions to specify for each particular switch of the plurality of switches, a threshold number of flow entries based on the respective maximum capacity of flow entries that can be installed on that particular switch;

program instructions to identify one or more switches in the network having a number of installed flow entries that is greater than or equal to the respective threshold number of flow entries that can be installed, wherein the program instructions to identify one or more switches in the network having a number of installed flow entries that is greater than or equal to the respective threshold number of flow entries that can be installed, comprise:

program instructions to monitor usage details of the plurality of switches in the network, program instructions to generate a table comprising the usage details and an indicator for each particular switch of the plurality of switches as to whether to exclude that particular switch from data path calculations, and program instructions to access the table to identify one or more switches in the network having an indicator that indicates that the switch should be excluded from data path calculations;
program instructions to exclude the identified one or more switches from a calculation of a shortest data path for a data packet through two or more of the plurality of switches, and
program instructions to, responsive to receiving from a first switch in the network a data packet that does not include a maximum capacity of flow entries that can be installed on the first switch, determining whether a second switch that is physically adjacent to the first switch has an indicator indicating that the second switch should be excluded from data path calculations; and
program instructions to, responsive to determining that the second switch has an indicator indicating that the second switch should be excluded from data path calculations, excluding the first switch from data path calculations.

7. The computer program product of claim 6, further comprising:
program instructions to, after the shortest data path is calculated, updating the usage details in the table.

8. The computer program product of claim 6, further comprising:
program instructions to, responsive to receiving from a first switch in the network a data packet that does not include a maximum capacity of flow entries that can be installed on the first switch, determining whether a second switch that is physically adjacent to the first switch has an indicator indicating that the second switch should be included in data path calculations; and
program instructions to, responsive to determining that the second switch has an indicator indicating that the second switch should be included in data path calculations, including the first switch in data path calculations.

9. The computer program product of claim 6, further comprising:
program instructions to receive an error notification from a first switch in the network that indicates that a number of flow entries installed on the first switch exceeds a maximum capacity of flow entries that can be installed on the first switch; and
program instructions to, responsive to receiving the error notification, setting an indicator for the first switch indicating that the first switch should be excluded from data path calculations.

10. The computer program product of claim 6, further comprising:
program instructions to install flow entries on each switch of the shortest data path.

11. A computer system for generating a shortest data path comprising:
one or more computer processors;
one or more computer readable storage media; and
program instructions stored on the one or more computer readable storage media for execution by at least one of the one or more processors, the program instructions comprising:
program instructions to receive from each particular switch of a plurality of switches in a network, a data packet comprising information indicating a respective maximum capacity of flow entries that can be installed on that particular switch;
program instructions to specify for each particular switch of the plurality of switches, a threshold number of flow entries based on the respective maximum capacity of flow entries that can be installed on that particular switch;
program instructions to identify one or more switches in the network having a number of installed flow entries that is greater than or equal to the respective threshold number of flow entries that can be installed, wherein the program instructions to identify one or more switches in the network having a number of installed flow entries that is greater than or equal to the respective threshold number of flow entries that can be installed, comprise:
program instructions to monitor usage details of the plurality of switches in the network,
program instructions to generate a table comprising the usage details and an indicator for each particular switch of the plurality of switches as to whether to exclude that particular switch from data path calculations, and
program instructions to access the table to identify one or more switches in the network having an indicator that indicates that the switch should be excluded from data path calculations;
program instructions to exclude the identified one or more switches from a calculation of a shortest data path for a data packet through two or more of the plurality of switches and
program instructions to, responsive to receiving from a first switch in the network a data packet that does not include a maximum capacity of flow entries that can be installed on the first switch, determining whether a second switch that is physically adjacent to the first switch has an indicator indicating that the second switch should be excluded from data path calculations; and
program instructions to, responsive to determining that the second switch has an indicator indicating that the second switch should be excluded from data path calculations, excluding the first switch from data path calculations.

12. The computer system of claim 11, further comprising:
program instructions to, after the shortest data path is calculated, updating the usage details in the table.

13. computer system of claim 11, further comprising:
program instructions to, responsive to receiving from a first switch in the network a data packet that does not include a maximum capacity of flow entries that can be installed on the first switch, determining whether a second switch that is physically adjacent to the first switch has an indicator indicating that the second switch should be included in data path calculations; and
program instructions to, responsive to determining that the second switch has an indicator indicating that the second switch should be included in data path calculations, including the first switch in data path calculations.

14. The computer system of claim 11, further comprising:
program instructions to receive an error notification from a first switch in the network that indicates that a number of flow entries installed on the first switch exceeds a maximum capacity of flow entries that can be installed on the first switch; and
program instructions to, responsive to receiving the error notification, setting an indicator for the first switch indicating that the first switch should be excluded from data path calculations.

* * * * *